(12) United States Patent
Salter et al.

(10) Patent No.: US 10,979,916 B2
(45) Date of Patent: Apr. 13, 2021

(54) MOBILE COMMUNICATIONS NETWORK (71) Applicant: BAE Systems plc, London (GB)

(72) Inventors: Robert John Salter, Christchurch (GB); Mark Timothy Bryant, Christchurch (GB); Nicolle Louise Drury, Christchurch (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 16/615,152

(22) PCT Filed: May 9, 2018

(86) PCT No.: PCT/GB2018/051234
§ 371 (c)(1),
(2) Date: Nov. 20, 2019

(87) PCT Pub. No.: WO2018/224797
PCT Pub. Date: Dec. 13, 2018

(65) Prior Publication Data
US 2020/0178091 A1 Jun. 4, 2020

(30) Foreign Application Priority Data
Jun. 6, 2017 (EP) ..................... 17174531
Jun. 6, 2017 (GB) ..................... 1708968

(51) Int. Cl.
H04W 24/02 (2009.01)
H04W 4/029 (2018.01)
H04W 4/40 (2018.01)

(52) U.S. Cl.
CPC ........... *H04W 24/02* (2013.01); *H04W 4/029* (2018.02); *H04W 4/40* (2018.02)

(58) Field of Classification Search
CPC ..... H04W 16/18; H04W 16/24; H04W 48/04; H04W 24/02; H04W 76/10; H04W 4/029; H04W 84/005; H04W 4/40
(Continued)

(56) References Cited

U.S. PATENT DOCUMENTS

2004/0116111 A1  6/2004  Saunders
2013/0273934 A1  10/2013  Meredith et al.
(Continued)

FOREIGN PATENT DOCUMENTS

CN  106792716 A  5/2017
EP  2555569 A1  2/2013
(Continued)

OTHER PUBLICATIONS

PCT International Search Report and Written Opinion for Appl No. PCT/US2018/051234 dated Jul. 5, 2018, 12 pages.
(Continued)

*Primary Examiner* — Charles N Appiah
*Assistant Examiner* — Frank E Donado
(74) *Attorney, Agent, or Firm* — Maine Cernota & Rardin (57) ABSTRACT A mobile communications network comprising a plurality of nodes, each node being disposed on a vehicle, wherein the plurality of nodes are configured to be connected to any one or more of a plurality of mobile devices, and the mobile communications network further comprising a planning and control module configured to:
receive or obtain first location data representative of a first location of at least one of the plurality of mobile devices and receive, periodically or otherwise, respective updated location data representative of the current location of the respective mobile devices;
receive, periodically or otherwise, second data from each of the nodes, the second data being representative of the respective coverage capability of the nodes;
(Continued)

receive data representative of a coverage requirement associated with a specified one or more of the mobile devices; and generate, using the updated location data and the second data, an output to cause the coverage capability of one or more of the nodes to be adjusted to meet the coverage requirement.

9 Claims, 2 Drawing Sheets

(58) Field of Classification Search
USPC ...................................................... 455/456.1
See application file for complete search history.

(56) References Cited

U.S. PATENT DOCUMENTS

| | | | |
|---|---|---|---|
| 2015/0120094 A1* | 4/2015 | Kimchi | ............. G05D 1/00 701/3 |
| 2015/0215892 A1 | 7/2015 | Teng | |
| 2016/0191142 A1* | 6/2016 | Boss | ............. H04W 28/0289 455/405 |
| 2017/0111102 A1* | 4/2017 | Fan | ............. H04B 7/18504 |
| 2018/0033315 A1* | 2/2018 | Winkle | ............. B64F 1/007 |
| 2019/0199419 A1* | 6/2019 | Teslenko | ............. H04W 4/029 |
| 2020/0154285 A1* | 5/2020 | Sturgeon | ............. G06T 17/05 |

FOREIGN PATENT DOCUMENTS

| | | |
|---|---|---|
| EP | 2938117 A1 | 10/2015 |
| WO | 20160012055 A1 | 1/2016 |
| WO | 20160198816 A1 | 12/2016 |

OTHER PUBLICATIONS

European Extended Search Report for Appl No. 17174531.8 dated Nov. 20, 2017, 7 pages.
Great Britain Search Report for Appl No. GB1708968.1 dated Oct. 24, 2017, 4 pages.
International Preliminary Report on Patentability for Appl No. PCT/GB2018/051234 dated Dec. 10, 2019, 7 pages.

* cited by examiner

MOBILE COMMUNICATIONS NETWORK

RELATED APPLICATIONS

This application is a national phase application filed under 35 USC § 371 of PCT Application No. PCT/GB2018/051234 with an International filing date of May 9, 2018, which claims priority of GB Patent Application 1708968.1 filed Jun. 6, 2017 and EP Patent Application 17174531.8 filed Jun. 6, 2017. Each of these applications is herein incorporated by reference in its entirety for all purposes.

FIELD OF THE INVENTION

This invention relates generally to a mobile communications network and, more particularly, to an adaptive mobile communications network configured to adapt network coverage to meet end user needs/requirements and ensure efficient use of the available spectrum.

BACKGROUND OF THE INVENTION

Standards for high-speed wireless communication for mobile phones and data terminals are known, and an example of such a standard is known in the art as Long-Term Evolution (LTE). One of the main drivers for the use of standards such as LTE is the high data rates that can be achieved. However, all technologies suffer from reduced data rates at the cell edge where signal levels are lower and interference levels are typically higher.

A communications (e.g. LTE) network conventionally comprises a plurality of base stations, typically provided in the form of static masts, which can communicate with each other and communicate directly with the core network. Mobile devices (user equipment or UEs) can connect to the network and, as the user moves through the coverage area, the base stations manage the radio resource and mobility within the coverage area to optimise all of the UE's communication in a flat radio network structure.

However, it is becoming increasingly common, in various fields and applications, to provide a so-called 'hotspot' in a mobile platform, which acts as a 'hub' or router to which a plurality of UEs can connect, and by means of which their mobile LTE connectivity can be managed and controlled.

It is known, for example, to provide an LTE vehicle hotspot system which acts as a 'hub' and that enables 'subscriber' devices to connect to an LTE network when they are in a predefined range thereof. When the UE is taken out of range of the hub, it can re-connect with the main LTE (or other communications) network, wherein the static masts are positioned to ensure a broad range of coverage with minimal interruption whilst ensuring efficient use of the spectrum. Given the static nature of the masts, such coverage is planned in such a way that optimised coverage (within an area) and efficient re-use of the spectrum is achieved. However, this static plan cannot adapt itself in real time to suit users' actual locations and needs.

There is, therefore, a desire to provide a mobile communication network in which coverage and re-use of available spectrum can be dynamically configured and reconfigured to adapt to and meet end users' real time locations and needs and/or the environment, and it is an object of the present invention to address this issue.

SUMMARY OF THE INVENTION

In accordance with a first aspect of the present invention, there is provided a mobile communications network comprising a plurality of nodes, each node being disposed on a vehicle, wherein the plurality of nodes are configured to be connected to one or more of a plurality of mobile devices, and the mobile communications network further comprising a planning and control module configured to:

receive or obtain first location data representative of a first location of at least one of said plurality of mobile devices and receive, periodically or otherwise, respective updated location data representative of the current location of the respective mobile devices;

receive, periodically or otherwise, second data from each of said nodes, said second data being representative of the respective coverage capability of said nodes;

receive data representative of a coverage requirement associated with a specified one or more of said mobile devices; and generate, using said updated location data and said second data, an output to cause the coverage capability of one or more of said nodes to be adjusted to meet said coverage requirement.

Thus, and in contrast to the prior art, aspects of the present invention provide a mobile communications network configured to adapt, dynamically, to suit the end users' needs and environment.

The said second data is advantageously representative of the current location and propagation characteristics of said nodes, such that either or both can be adjusted to meet a specified coverage requirement in the most efficient and optimum manner. It will be apparent to a person skilled in the art that the above-mentioned "coverage capability" of a node in relation to a mobile device will be dependent on its location (relative to that mobile device), but also its current propagation characteristics. Such propagation characteristics may be inherent to the antenna (or at least to the antenna's current characteristics), e.g. azimuth, elevation, strength, gain, frequency, pointing direction, but may also be dependent on environmental conditions, such as weather, climate, density and/or nature of surrounding obstructions. Thus, it is to be understood that the term "coverage capability" may incorporate any or all of these factors, and is not necessarily intended to be otherwise limited than to mean the network coverage a node can currently provide to a mobile device (or is capable of providing thereto if one or more variables are altered).

The "output" referenced above, therefore, may, for example, comprise a signal that instructs or otherwise causes a node to change direction, change location or otherwise move with respect to a specified mobile device. The output signal may, additionally or alternatively, be configured to cause one or more of the propagation characteristics of a node to be altered (by, for example, altering the gain, frequency or pointing direction, or indeed causing the node to move out of an area of adverse environmental conditions).

Thus, such adjustment of said propagation characteristics may optionally comprise altering gain, frequency, pointing direction, azimuth, elevation and/or strength of an antenna of a respective node. However, and as explained above, it will be appreciated by a person skilled in the art that the term "propagation characteristics" is not necessarily limited to these variables.

The planning and control module may be a distributed function that is provided in (or across) each of a plurality of said nodes. Equally, the planning and control module may be a function that is distributed across the mobile devices and configured to enable the subscriber nodes to share their respective locations and even their propagation characteristics with each other as well as the nodes. Indeed, it is envisaged that, in accordance with one exemplary embodiment of the invention, the planning and control module is provided as a distributed function that is configured to enable each of the nodes and each of the mobile devices to share at least location data and, optionally, respective propagation characteristics with each other. In yet another exemplary embodiment, the planning and control module may be incorporated in a single 'master' node and configured to perform the planning and control function for all of the other nodes (and, optionally, mobile devices), or indeed, an additional 'command and control' (static or mobile) node may be provided within the network, in which the planning and control module is incorporated and configured to perform the planning and control function for all of the nodes (and optionally mobile devices) in the communications network.

Thus, the output may be in the form of a single control signal from a 'command and control' (mobile or static) node, or a 'master' node, to one or more of the other nodes instructing or causing it/them to alter their coverage capability in relation to one or more specified mobile devices. The one or more specified mobile devices may be defined by the current mission objectives, which may be changing dynamically (although it is envisaged, in some exemplary embodiments, that the mission plan may be static and the coverage provision for each of the mobile devices, whilst potentially variable during the course of the mission, may be pre-planned—thus, in this case, the coverage requirements for each mobile device over time and during the mission may be pre-planned and the mobile device(s) to be supported at each stage pre-specified).

The planning and control module may, therefore, be configured to receive identification data representative of a specified one or more of said mobile devices. Such identification data may be received from a mission planning system (before or during a mission), from a 'command and control' (mobile or static) node, from one or more of the nodes, or even from one or more of the mobile devices themselves, depending on the configuration of the network and/or the implementation of the planning and control module.

Irrespective of its physical implementation, the planning and control module may, optionally, be further configured to predict a future trajectory or path of one or more of said mobile devices, based on said location data, and predict therefrom a coverage requirement associated with said one or more of said mobile devices. Equally, and in an exemplary embodiment, the planning and control module may be configured to predict a future trajectory or path of one or more of the nodes and predict therefrom a future coverage capability.

Furthermore, the planning and control module may, optionally, be configured to receive data representative of a selected one or more high priority mobile devices, and further configured, in respect of a selected high priority mobile device, to cause the coverage capability of one or more of said nodes to be adjusted to provide an enhanced coverage requirement thereto.

In accordance with a second aspect of the present invention, there is provided a node for a mobile communication network substantially as described above, configured to provide a wireless communications hub for one or more mobile devices, said node comprising a planning and control module configured to:

receive or obtain first location data representative of a first location of at least one of said plurality of mobile devices and receive, periodically or otherwise, respective updated location data representative of the current location of the respective mobile devices;

receive, periodically or otherwise, second data from each other of said nodes, said second data being representative of the respective coverage capability of said nodes;

receive data representative of a coverage requirement associated with a specified one or more of said mobile devices; and generate, using said updated location data and said second data, an output to cause the coverage capability of said node and/or one or more of said other of said nodes to be adjusted to meet said coverage requirement.

In accordance with a third aspect of the present invention, there is provided a planning and control module for a mobile communications network substantially as described above, configured to:

receive or obtain first location data representative of a first location of at least one of said plurality of mobile devices and receive, periodically or otherwise, respective updated location data representative of the current location of the respective mobile devices;

receive, periodically or otherwise, second data from each of said nodes, said second data being representative of the respective coverage capability of said nodes;

receive data representative of a coverage requirement associated with a specified one or more of said mobile devices; and generate, using said updated location data and said second data, an output to cause the coverage capability of one or more of said nodes to be adjusted to meet said coverage requirement.

In accordance with yet another aspect of the present invention, there is provided a method of dynamically configuring a mobile communications network comprising a plurality of nodes and a plurality of mobile devices, the method comprising:

receiving or obtaining first location data representative of a first location of at least one of said plurality of mobile devices and receiving, periodically or otherwise, respective updated location data representative of the current location of the respective mobile devices;

receiving, periodically or otherwise, second data from each of said nodes, said second data being representative of the respective coverage capability of said nodes;

receiving data representative of a coverage requirement associated with a specified one or more of said mobile devices; and generating, using said updated location data and said second data, an output to cause the coverage capability of one or more of said nodes to be adjusted to meet said coverage requirement. An aspect of the present invention extends to a program or plurality of programs arranged such that execution thereof by a computer system causes the computer system to perform the method substantially as described above.

In accordance with another aspect of the present invention, there is provided a method of providing a mobile communications network, comprising:

providing a plurality of nodes, configured to be connected to any one or more of a plurality of mobile devices; and providing and configuring a planning and control module to:

receive or obtain first location data representative of a first location of at least one of said plurality of mobile devices and receive, periodically or otherwise, respective updated location data representative of the current location of the respective mobile devices;

receive, periodically or otherwise, second data from each of said nodes, said second data being representative of the respective coverage capability of said nodes;

receive data representative of a coverage requirement associated with a specified one or more of said mobile devices; and generate, using said updated location data and said second data, an output to cause the coverage capability of one or more of said nodes to be adjusted to meet said coverage requirement.

BRIEF DESCRIPTION OF THE DRAWINGS

These and other aspects of the present invention will be apparent from the following specific description in which embodiments of the present invention are described, by way of examples only, and with reference to the accompanying drawings, in which.

DETAILED DESCRIPTION OF THE DRAWINGS

Figure 1:
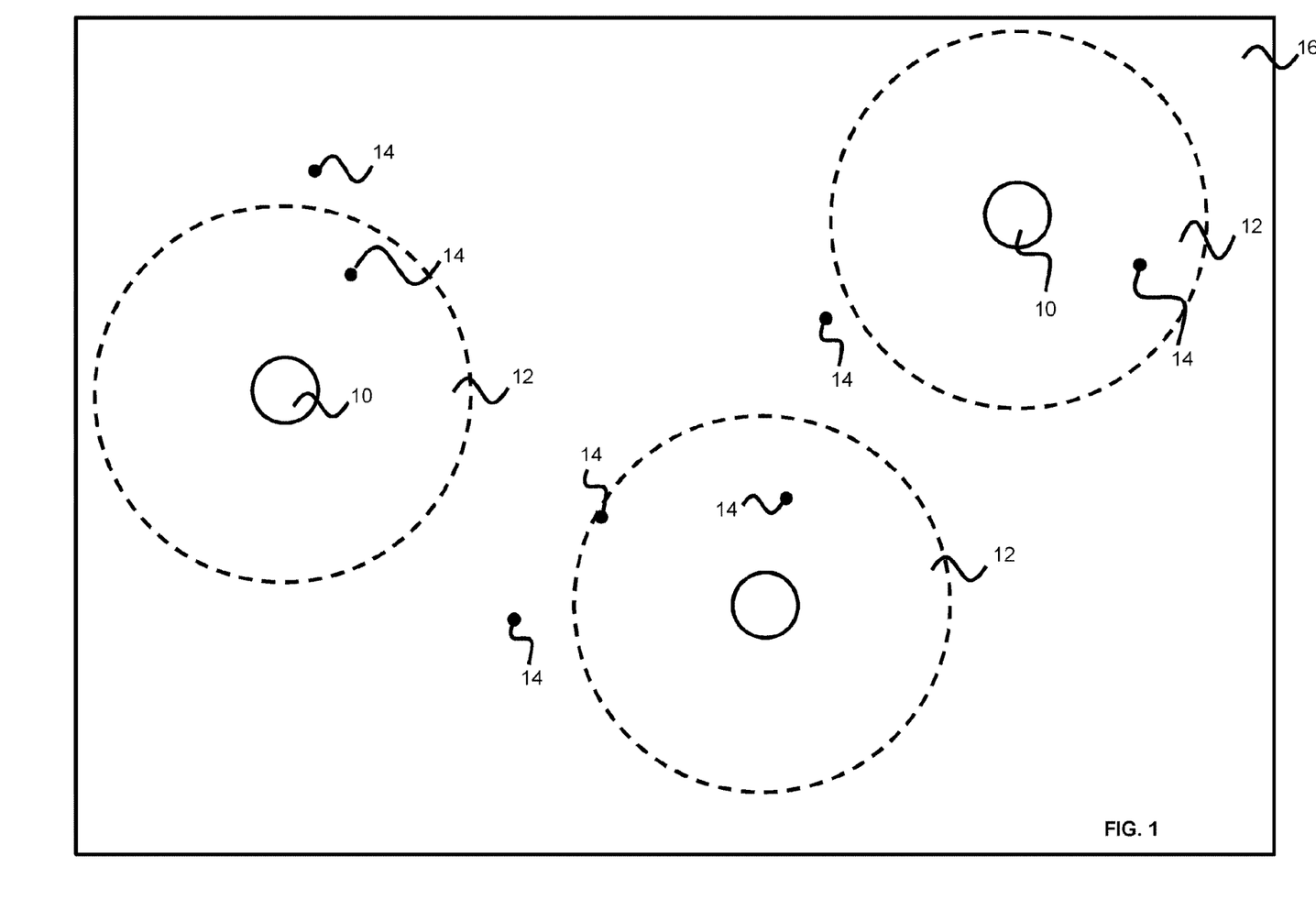
FIG. 1 is a schematic diagram illustrating a mobile LTE communications network according to an exemplary embodiment of the present invention.

Referring to FIG. 1 of the drawings, there is illustrated schematically, a mobile LTE communications network according to an exemplary embodiment of the present invention. The illustrated network comprises a plurality of LTE core nodes 10 integrated with respective vehicles or mobile platforms, each capable of providing a mobile hotspot. For example, the LTE core nodes may be installed in a number of trucks, aerial drones, or even autonomous naval vessels. Indeed, the present invention is not necessarily intended to be limited in this regard. Each core node is configured to provide LTE communications coverage over a predetermined maximum region 12 around its antenna (not shown). The network further comprises a plurality of mobile subscriber nodes 14 (i.e. mobile devices) which are LTE-enabled and capable of LTE communication via the various core nodes 10 when they are in range. The region 16 required to be serviced by the communications network is included for illustrative purposes only, and is in no way intended to reflect the size or, indeed, the shape of the region required to be serviced. Furthermore, the number (as well as the relative locations) of both the LTE core nodes 10 and the subscriber nodes 14 may vary, and the present invention is not intended to be limited in this regard. Indeed, the number of core nodes 10 can be optimised using aspects of the present invention, thus minimising the number of such hotspots that need to be deployed to meet a predetermined need.

Each LTE core node 10 comprises an antenna having variable propagation characteristics and directional gain, which determines the strength and extent of LTE coverage at any given time and at any given location. All of the core nodes 10 and the subscriber nodes 14 are entirely mobile and can move freely within the region 16 (and beyond). Such subscriber nodes 14 may, for example, comprise mobile phones, computing devices such as laptops, or even the situational awareness and communications systems integrated into armored vehicles or ships, or a mixture of two or more of these. Other suitable subscriber nodes 14 will be apparent to a person skilled in the art and the present invention is not necessarily intended to be limited in this regard.

Each subscriber node 14 is communicably coupled to an integral positioning system, such as GPS or the like, that generates data representative of the absolute location thereof, either periodically or continuously. Each subscriber node 14 is configured to transmit such position data such that it can be used by the set of mobile LTE core nodes 10 in configuring a coverage plan to meet the needs of the subscriber nodes 14. A planning and control module (not shown) is provided to configure and execute such a plan. The planning and control module may be provided within one of the LTE core nodes 10, for example, but is advantageously distributed across all of the LTE core nodes 10, such that each core node 10 receives the above-mentioned position data from all of the subscriber nodes 14 in range. Such position data can then (optionally) be re-transmitted by those core nodes 10 that have received it, to ensure that the LTE core nodes not currently in range have access to a complete "picture" of the current network of subscriber nodes 14, in real time.

Furthermore, each LTE core node 10 is coupled to a positioning system (which may be integrated in the respective vehicle telematics system), such as GPS or the like, that generates data representative of the absolute location thereof, either periodically or continuously, and transmits such position data to each of the other LTE core nodes 10 and, optionally, to the subscriber nodes 14.

As stated above, the communications coverage or coverage capability 12 of each LTE core node 10 is defined, at least in part, by the propagation characteristics of its respective antenna, which define its direction and/or directional gain. It will be appreciated by a person skilled in the art that the term "propagation characteristics" may include characteristics such as, but not limited to, strength, elevation and azimuth of transmission of LTE communications. However, it will also be understood that the coverage capability 12 of a core node 10 in relation to a subscriber node 14 may also be affected by environmental/weather conditions and, of course, its location/orientation relative to the subscriber node 14. Data representative of the coverage capability 12 of each core node 10 is transmitted to/shared with each of the other core nodes 10, thus further enhancing each core node's understanding of the current communications network in real time. Indeed, the propagation characteristics of each of the subscriber nodes 14 may also be shared with the LTE core nodes and, optionally, the other subscriber nodes 14, via the planning and control module.

As a result, each LTE core node 10 (at least) is provided with constantly updated data representative of a complete topography of the current communications network in real time, including the current location of core nodes 10, their coverage and current location of subscriber nodes 14.

As the subscriber nodes 14 move around the region 16, the distributed planning and control module monitors their coverage requirements and can direct the LTE core nodes 10 to move accordingly, so that sufficient (and efficient) coverage is provided and maintained, according to the needs of the subscriber nodes 14. Furthermore, and according to the LTE core node's current location and propagation characteristics, and the current location(s) (and, optionally, propagation characteristics) of the subscriber node(s) it is supporting, it can adjust the direction and directional gain (i.e.

the propagation characteristics) of its antenna as appropriate, in order to, for example, increase the distance within which communication is possible.

In its simplest form, then, the algorithm utilised by the planning and control module may dynamically reconfigure the coverage and use of the spectrum provided by the communications network by changing the location and/or propagation characteristics of the LTE core nodes 10. However, in another exemplary embodiment, the planning and control module may also be configured to recognise allocated (pre-allocated or dynamically allocated) high priority subscriber nodes 14, such that additional, wider or broader coverage is provided to them, for example, by moving or maintaining more than one LTE core node 10 within their range, or changing the propagation characteristics of several nearby LTE core nodes 10 to concentrate coverage on a high priority subscriber node 14.

Figure 2:
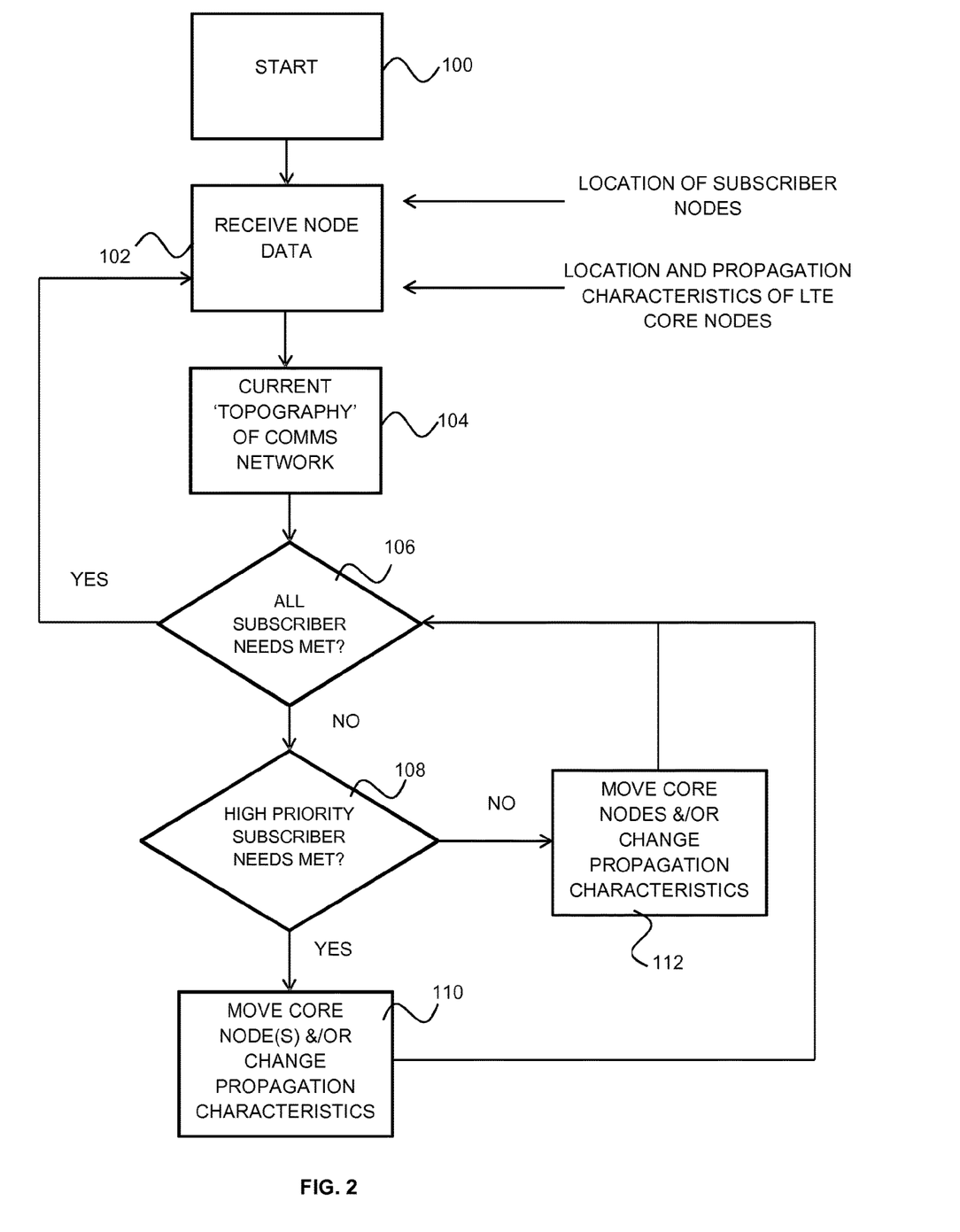
FIG. 2 is a schematic flow diagram illustrating a method performed by a planning and control function of a mobile LTE communications network according to an exemplary embodiment of the present invention.

Referring additionally to FIG. 2 of the drawings, a schematic flow diagram illustrating the principal operative functionality of the planning and control module is illustrated. The process starts at step 100. At step 102, the module receives data from all of the mobile nodes 10, 14 (i.e. both LTE core nodes 10 and subscriber nodes 14) in the communications network. Thus, the module receives position data representative of the respective positions of the subscriber nodes 14, position data representative of the locations of the mobile LTE core nodes, and also data representative of the coverage capability (e.g. propagation characteristics) of (at least) each of the mobile LTE core nodes 10. At step 104, the module generates a current 'topography' of the communications network, based on the data received at step 102.

Next, at step 106, the module determines if all of the subscriber node needs are being met—do they have adequate coverage, are they within range of at least one LTE core node 10, does that at least one LTE core node 10 have a sufficiently long range to support their transmission requirements, etc? If yes, the process returns to step 102, to await new position/propagation characteristic data, so that the assessment process can be repeated. If no, the process moves to step 108, wherein the needs of any high priority subscribers are assessed and a determination is made as to whether or not those needs are being met by the current communications network configuration/topography. If yes, the process can move on to performing the same assessment, at step 110, in respect of non high priority subscriber nodes. If no, the module first addresses the needs of the high priority subscriber nodes (at step 112) by moving one or more LTE core nodes into the vicinity of the unmet need and/or changing the propagation characteristics of any LTE core nodes 10 already located nearby, before moving on to step 110. If any non high priority subscriber node needs are not being met, the module is configured (at step 110) to cause one or more LTE core nodes 10 to move into their vicinity and/or change the propagation characteristics of any LTE core nodes 10 already in their vicinity, before the process returns to step 102 to await further/updated position/propagation characteristics data.

Still further, the planning and control module may be configured to utilise the position data received from the subscriber nodes to predict their future movement, based on their current location, direction of movement and speed, as well as an understanding of terrain and local geography, to enable it to generate and effect a coverage plan in advance. Equally, the planning and control module may be configured to utilise position data received from the LTE core nodes to predict their future movement, based on their current location, direction of movement and speed, as well as an understanding of terrain and local geography, to enable it to predict future coverage.

Thus, in contrast to a mobile LTE communications network that uses static nodes or 'masts', the present invention provides a communications network in which a flexible and dynamic configuration solution is provided for subscriber nodes 14 that are, themselves, mobile. This is achieved by the sharing of information between clustered nodes, with the principal aim of providing optimised coverage to subscribers. The information shared between the LTE core nodes 10, in the above-described embodiment, includes (but is not necessarily limited to): their own location in real time, their current propagation characteristics and the location of their subscriber nodes 14 in real time. By sharing this information, it enables the LTE core nodes 10 to dynamically adjust their coverage and geospatial location to deliver the most effective service for exigent needs of an ongoing operation by minimising gaps in coverage.

As the LTE core nodes 10 know their own real time location, it allows them to share this with the other connected LTE core nodes 10 in order to enable the planning and control module to decide which core node(s) should be supporting specific subscriber nodes 14, and may be caused or directed to relocate in order to provide the required coverage. Furthermore, subscriber nodes 14 share their location with the LTE core nodes 10, to enable the planning and control module to adjust, where necessary, the direction (and directional gain) of selected LTE core nodes 10 to increase the distance within which transmissions are possible. Knowing the location of the subscriber nodes 14 means that, unlike conventional solutions using static masts, the coverage can be dynamically altered to suit a particular situation and requirement and this is done, as described above, by moving the LTE core nodes 10 and/or altering their propagation characteristics to follow and cover all allocated subscriber nodes 14. An algorithm, which may distributed across all of the LTE core nodes 10 (and, in some exemplary embodiments, also the subscriber nodes 14), is utilised to provide the logic behind the core node allocation to the subscriber nodes 14. There are a number of different ways in which this could be realised, and suitable algorithms, based on core/subscriber node location and LTE core node propagation characteristics and coverage, and realizations thereof, will be apparent to a person skilled in the art.

Still further, the location information can be used to predict future movement of the subscriber nodes 14 which would allow for an informed coverage plan to be developed ahead of time. These predictions could be made as a result of pre-planned movement, based on subscriber node speed and direction or based on an understanding of terrain and local geography (e.g. a subscriber node is likely to continue to follow the road they are currently on).

The present invention may find particular use in military applications, rescue and aid missions, or exploratory and research operations, to ensure coverage for their end users throughout a mission, as opposed to relying on static infrastructure which may be damaged or destroyed, or may simply not exist at all in some remote locations. Airborne, waterborne or land LTE nodes providing area coverage could utilise embodiments of the present invention to optimise the platform locations across a large geographic area.

The planning and control module described above may be implemented in a number of different network distributions. For example, there could be a so-called 'master' core node 10 that incorporates a planning and control module as described above for all of the other core nodes 10. In alternative exemplary embodiments, each of a plurality of the core nodes 10 (or all of the core nodes 10) may incorporate a planning and control module as described above, thus providing distributed control across the communications network with a degree of built-in redundancy, advantageous if one or more of the core nodes becomes inoperative for any reason. In yet another exemplary embodiment, the communications network may include a 'command and control' node (i.e. a vehicle or ground station) including a command and control module as described above in respect of all of the core nodes 10 and distribute output signals to control each and all of them. In some exemplary embodiments, in which the planning and control function is distributed amongst two or more core nodes, the respective planning and control modules may include a neural network optimisation function and be configured to communicate with each other to "discuss and learn" the best way to achieve the mission objectives.

It will be apparent to a person skilled in the art, from the foregoing description, that modifications and variations can be made to the described embodiments without departing from the scope of the invention as defined by the appended claims. For example, whilst a mobile LTE communications network has been specifically described above, it is to be understood that the present invention may be applied to other types of mobile communications networks, adhering to different standards (for example, WiFi or UMTS), and the present invention is not necessarily intended to be limited in this regard.

The invention claimed is:

1. A mobile communications network comprising:
  a plurality of nodes, each node being disposed on a vehicle and comprising at least one antenna having variable propagation characteristics and directional gain, wherein the plurality of nodes are configured to be wirelessly connected to one or more of a plurality of mobile devices; and
  a planning and control module configured to:
    receive or obtain position data representative of a trajectory of at least one of said plurality of mobile devices;
    receive, periodically or otherwise, coverage data from each of said nodes, said coverage data being representative of the respective coverage capability and a current location of said nodes;
    predict a future position of the at least one of said mobile devices, based on said position data, and predict therefrom a coverage requirement associated with the at least one mobile device; and
    generate, using said coverage data, an output signal configured to cause the location and the propagation characteristics of an antenna of a respective node of said one or more of said nodes to be adjusted, wherein the adjustment of said propagation characteristics comprises altering the gain and a frequency, pointing direction, azimuth, elevation and strength of an antenna of a respective node, to cause the coverage capability of one or more of said nodes to be adjusted to meet said coverage requirement.

2. The mobile communications network according to claim 1, wherein said output comprises a signal configured to instruct or cause said one or more nodes to change location relative to said specified one or more mobile devices.

3. The mobile communications network according to claim 1, wherein said planning and control module is incorporated in one or more of said nodes.

4. The mobile communications network according to claim 3, wherein said planning and control module is provided in, or distributed across, each of a plurality of said nodes, and configured to receive updated location data from each of said plurality of mobile devices and said coverage data from each other of said plurality of nodes.

5. The mobile communications network according to claim 1, wherein said planning and control module is configured to receive data representative of a selected one or more high priority mobile devices, and further configured, in respect of a selected high priority mobile device, to cause the coverage capability in relation thereto of one or more of said nodes to be adjusted to provide an enhanced coverage requirement thereto.

6. A node for a mobile communication network according to claim 1, configured to provide a wireless communications hotspot for one or more of said plurality of mobile devices, said node being coupled to a planning and control module configured to:
  receive or obtain position data representative of a trajectory of at least one of said plurality of mobile devices;
  receive, periodically or otherwise, coverage data from each of said nodes, said coverage data being representative of the respective coverage capability of said nodes;
  predict a future position of the at least one of said mobile devices based on said position data, and predict therefrom a coverage requirement associated with the at least one mobile; and
  generate, using coverage data, an output to cause the coverage capability of one or more of said nodes to be adjusted to meet said coverage requirement.

7. A planning and control module for a mobile communications network according to claim 1, the planning and control module configured to:
  receive or obtain position data representative of a trajectory of at least one of said plurality of mobile devices;
  receive, periodically or otherwise, coverage data from each of said nodes, said coverage data being representative of the respective coverage capability of said nodes;
  predict a future position of the at least one of said mobile devices, based on said position data, and predict therefrom a coverage requirement associated with the at least one mobile device; and
  generate, using said coverage data, an output to cause the coverage capability of one or more of said nodes to be adjusted to meet said coverage requirement.

8. A method of dynamically configuring a mobile communications network comprising a plurality of nodes, each node being disposed on a vehicle and comprising at least one antenna having variable propagation characteristics and directional gain, and a plurality of mobile devices, the method comprising:
  receiving or obtaining position data representative of a trajectory of at least one of said plurality of mobile devices;
    receiving, periodically or otherwise, coverage data from each of said nodes, said coverage data being representative of a respective wireless coverage capability and a current location of said nodes;
    predicting a future position of the at least one of said mobile devices, based on said position data, and predicting therefrom a coverage requirement associated with the at least one mobile device; and
    generating, using said coverage data, an output signal configured to cause the location and the propagation characteristics of an antenna of a respective node of said one or more of said nodes to be adjusted, wherein the adjustment of said propagation characteristics comprises altering the gain and a frequency, pointing direction, azimuth, elevation and strength of an antenna of a respective node, to cause the coverage capability of one or more of said nodes to be adjusted to meet said coverage requirement.

9. A method of providing a mobile communications network, the method comprising:
 providing a plurality of nodes, each node being disposed on a vehicle and comprising at least one antenna having variable propagation characteristics and directional gain, configured to be wirelessly connected to any one or more of a plurality of mobile devices; and
 providing a planning and control module configured to:
  receive or obtain position data representative of a trajectory of at least one of said plurality of mobile devices;
  receive, periodically or otherwise, coverage data from each of said nodes, said coverage data being representative of the respective coverage capability and a current location of said nodes;
  predict a future position of the at least one of said mobile devices, based on said position data, and predict therefrom a coverage requirement associated with the at least one mobile device; and
  generate, using said coverage data, an output signal configured to cause the location and the propagation characteristics of an antenna of a respective node of said one or more of said nodes to be adjusted, wherein the adjustment of said propagation characteristics comprises altering the gain and a frequency, pointing direction, azimuth, elevation and strength of an antenna of a respective node, to cause the coverage capability of one or more of said nodes to be adjusted to meet said coverage requirement.

* * * * *

UNITED STATES PATENT AND TRADEMARK OFFICE
CERTIFICATE OF CORRECTION

| | |
|---|---|
| PATENT NO. | : 10,979,916 B2 |
| APPLICATION NO. | : 16/615152 |
| DATED | : April 13, 2021 |
| INVENTOR(S) | : Salter et al. |

It is certified that error appears in the above-identified patent and that said Letters Patent is hereby corrected as shown below:

In the Claims

Column 10, Line 29: Add "devices" between "mobile" and ";"

Signed and Sealed this
Eleventh Day of October, 2022

Katherine Kelly Vidal
*Director of the United States Patent and Trademark Office*